United States Patent Office 3,317,120
Patented May 2, 1967

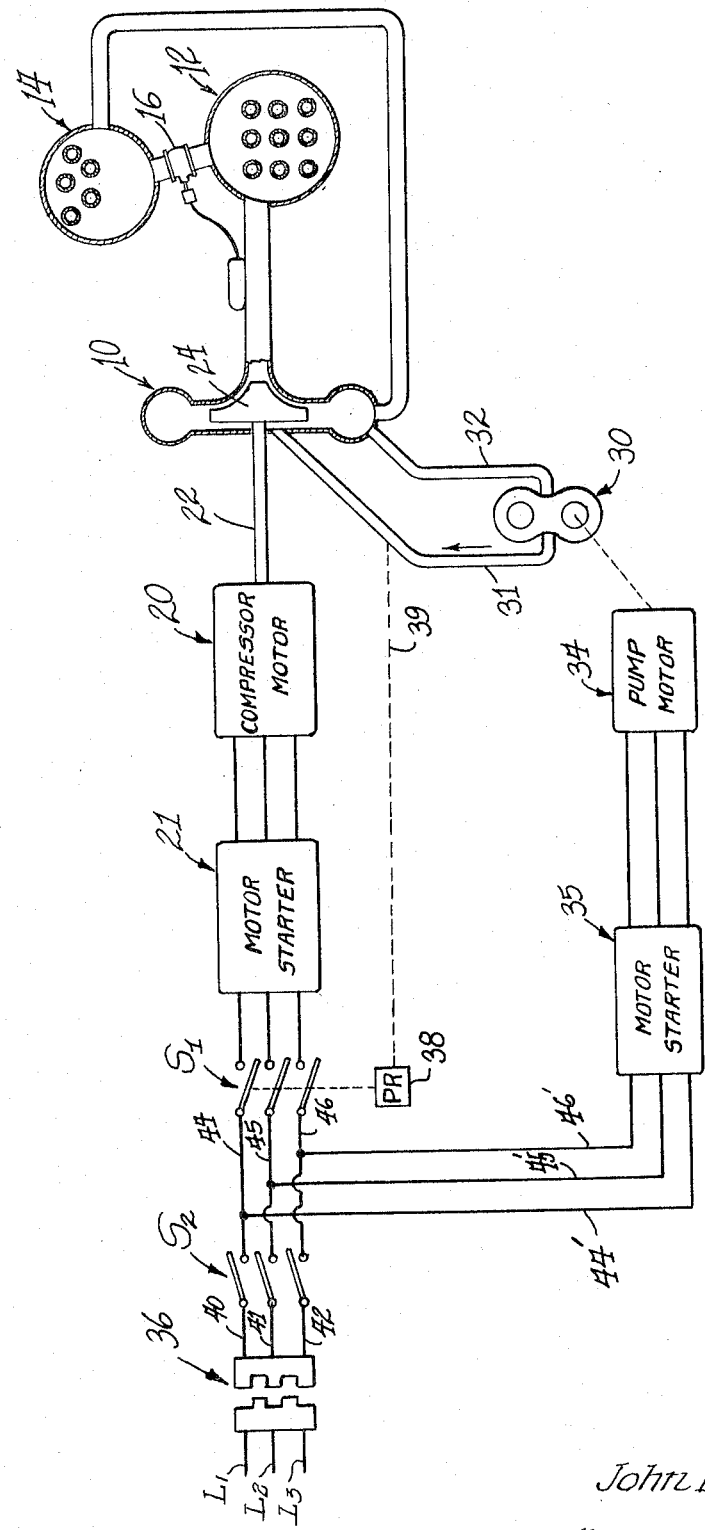

3,317,120
COMPRESSOR DRIVE SYSTEM
John M. Schultz, York, Pa., assignor to Borg-Warner Corporation, a corporation of Illinois
Filed Dec. 28, 1964, Ser. No. 421,497
5 Claims. (Cl. 230—1)

This invention relates generally to compressor drive systems, and more particularly to an improved compressor motor starter circuit which will prevent a compressor from being driven in an improper direction, even if the drive motor is improperly connected to the electrical power supply.

In many heavy-duty applications, such as refrigeration systems which utilize a centrifugal compressor, it is often imperative that the compressor be driven in one direction only. While the specific reasons for this requirement may vary from one application to another, in one known compressor construction, the compressor rotor is threaded onto the drive shaft. When driven in the proper direction, the drive shaft torque is employed to maintain the rotor firmly fixed on the shaft by the tendency of the shaft to further penetrate a complementally threaded blind bore in the rotor. However, if the drive shaft is driven in the opposite direction, the shaft can unscrew itself from the rotor. If this occurs and immediate action is not taken, the rotor will become disconnected from the shaft, causing damage to the threads and, at the very least, will require that the entire compressor be disassembled and the rotor replaced on the shaft.

Most incidences of the compressor being driven in the opposite direction can be attributed to the failure of personnel installing or maintaining the compressor to properly follow the directions for connecting the motor to the power supply and to observe the correct start-up procedure. Compressors of a relatively large capacity, for which the application of the present invention is most useful, are normally driven by heavy-duty, three-phase electric motors. Such motors are capable of running in either direction depending on the manner in which the power supply is connected thereto. This is also true of single phase motors, but the difficulty of properly determining the phase relation of a three-phase power supply makes an improper installation more likely.

It has also been found that, even if the unit is properly connected at the terminal board or other power outlet, it is possible that the phase relation of the power supplied to the terminal board can be reversed during installation of the main power supply circuit or repair thereof. In order to insure that the compressor is being driven in the proper direction, the operator is normally given instructions to "inch" the rotor by closing the motor circuit for a very short time to cause it to rotate in short increments. Unfortunately, this recommended procedure is not always observed, and many times, the compressor motor circuit is closed for regular operation when the power supply is connected in such a manner that reverse or improper rotation will occur.

The present invention is directed to an improved compressor motor starter circuit which, without the use of any additional components not present in the conventional compressor unit, will automatically prevent the circuit between the power supply and the compressor motor from being closed in the event an improper phase relation or connection between the power supply and the motor will cause reverse rotation of the compressor. Since an auxiliary pump for supplying lubricant to the compressor and low oil pressure switch are conventional in compressor systems of this type, a connection between the respective compressor and auxiliary pump motors will achieve the desired objective without the use of sophisticated rotation sensing switch mechanisms or other means for preventing the actuation of the compressor motor circuit under the aforementioned circumstances.

It is, therefore, a principal object of the invention to provide a compressor motor starter circuit in which the compressor motor is prevented from being energized if it is improperly connected to the power supply.

It is another object of the invention to prevent reverse rotation of the compressor by utilizing only those components which are already included in the conventional compressor system.

Additional objects and advantages will be apparent from the following detailed description taken in conjunction with the drawing wherein the single figure is a schematic or diagramatic representation of a refrigeration system embodying the principles of the present invention.

While the description herein will be concerned with a refrigeration system utilizing a centrifugal type compressor, it will be appreciated that the invention could be applicable to other types of systems using compressors or different types of driven loads. Also, for purposes of definition, the terms "proper" and "improper," as applied to both the direction of rotation of the compressor or driven load and the manner in which the motor is connected to the power supply, are to be understood in their ordinary sense. In other words, an "improper" direction of rotation would mean the direction which is incorrect or undesirable for any purpose. Similarly, when referring to the manner in which the motor is connected to the power supply, a "proper" connection would be one which would, if the circuit is closed, energize the motor to drive the compressor in the correct or desired direction.

Referring now to the figure, centrifugal compressor 10 is shown in combination with a refrigeration system including an evaporator 12, a condenser 14, and a refrigerant control valve 16 which, although indicated as being temperature responsive, may be of any suitable type. The compressor is driven by means of an electric motor 20 through a drive shaft 22 connected to the compressor rotor 24. As pointed out above in this specification, the connection between the drive shaft and the compressor rotor is such that it is imperative that the compressor be driven in one direction only. This connection may take the form of the aforementioned threaded arrangement; but it will be appreciated that the invention is applicable to any combination in which, for one reason or another, the load must never be driven in an improper direction.

As is common in systems of this type, the compressor is supplied with oil or other lubricant by a pump means 30 driven by a second electrical motor 34 having a motor starter 35 associated thereafter. During operation of the compressor, oil is continuously circulated to the compressor through line 31 and returned to the pump inlet through line 32 to lubricate and cool the bearing and seals associated with the compressor. Since the compressor is dependent upon proper lubrication, an interlock is associated with the lubrication system and the compressor motor to prevent actuation of the compressor motor until the flow of oil to the compressor is assured. Similarly, the interlock functions as a low pressure limit device to interrupt the circuit to the compressor motor if lubricant pressure should fail during operation of the unit.

In a preferred embodiment, the interlock means comprises switch $S_1$ which is operated by pressure responsive actuator 38 which is operatively connected through line 39 to the discharge side of the pump. Discharge pressure of the oil is sensed, for example, in conduit 31 carrying it to the compressor. $S_1$ is adapted to make and break the circuit between the power supply and the compressor motor starter 21 in the event pressure should fail or if, for one reason or another, pressure should not be at a predetermined minimum level upon initiation of the compressor circuit. It should be pointed out that pump 30 will only supply the lubricant at the proper pressure if it is being driven in the proper direction. If it is driven in the reverse direction, the pressure responsive actuator will maintain $S_1$ open and maintain an open circuit between the power supply and the compressor motor starter.

The interlock as will be seen from the following description cooperates with the conductor means supplying electrical energy to both motors to prevent actuation of the compressor motor in the event an improper connection is made of the phase relationship if the electrical energy supplied is altered in any way. The source of electrical energy or power supply for both motors is brought into a suitable outlet, terminal box or other connector device, indicated at 36, through electrical conductors $L_1$, $L_2$, and $L_3$. It should be understood that, while this conventional notation indicates a three-phase power supply, the problems resulting from improper wiring also exist with the use of single phase motors and power supplied. From the point of connection to the power supply at 36, conductors 40, 41, 42 lead to a main switch $S_2$ which makes and breaks the circuit to both motors and, therefore, controls the operation thereof. The portion of the electrical conductor means which includes conductors 40, 41, 42 and switch $S_2$ is common to both motors and branches off into a first group of parallel conductors 44, 45, 46 leading through switch $S_1$ to compressor motor starter 21, and a second group of conductors 44', 45', 46' leading to pump motor starter 35. The relationship between the conductor means carrying electrical energy to both motors, i.e. 44, 45, 46 and 44', 45', 46', is such that if all circuits are closed between the respective motors and main switch $S_2$, both the compressor and the pump will be driven in either a proper direction or in an improper direction simultaneously. This will be true no matter how the phase relationship of energy supplied through $L_1$, $L_2$, and $L_3$ is altered or how conductors 40, 41, or 42 are connected to the power supply.

*Operation*

The first situation to be considered is one in which the electrical connection between the motors and the power supply is correct and/or the phase relation of the power available is such that the compressor will be driven in the proper direction if the circuit therebetween were to be closed. In this case, when main switch $S_2$ is closed, electrical energy will be supplied to the pump motor starter 35 through conductors 40, 41, 42 and conductors 44', 45', 46'. The pump motor starter will immediately initiate operation of the pump motor which, under the assumption given, will drive the pump 30 to supply oil to the compressor. Until pressure on the discharge side of the pump reaches a predetermined minimum value, switch $S_1$ remains open. When said predetermined pressure is reached, pressure responsive actuator 38 will close the switch $S_1$ and electrical energy will be carried through conductors 44, 45, 46 to the compressor motor starter 21. Energization of the compressor motor starter will then initiate operation of the compressor motor which will drive the compressor rotor 24 in the proper direction. If, for any reason, the supply of oil to the compressor should stop due to failure of the pump or a clogged oil passage, the pressure responsive actuator will open switch $S_1$ to shut down the compressor.

In the second case, an assumption will be made that the connection made at 36 is improper or the phase relation of the power supplied to the point of connection through conductors $L_1$, $L_2$, and $L_3$ is such that the compressor motor will run in reverse or an improper direction. In this situation, when $S_2$ is closed, the power supplied to the pump motor starter 35 will cause pump motor 34 to run in an improper direction driving pump 30 in reverse. When this occurs, the oil pressure, as sensed by the pressure responsive actuator 38, will never reach the predetermined minimum value and switch $S_1$ will remain in an open position, thereby preventing the closing of a circuit to compressor motor starter 21.

From the foregoing description, it will be appreciated that the present invention provides a very simple, inexpensive means for preventing damage to the compressor without the use of any additional equipment not found in the conventional compressor unit. While the invention has been described in connection with a certain specific embodiment, it should be understood that the description is set forth merely as an example, and that various modifications will be obvious to those skilled in the art. Therefore, the scope of the invention is defined solely by the appended claims which should be construed as broadly as the prior art will permit.

I claim:

1. In apparatus of the character described, the combination comprising a compressor; a first electric motor operatively connected to drive said compressor; pump means adapted to supply a lubricant to said compressor; a second electric motor operatively connected to drive said pump means, both of said motors being of the reversible type which are capable of driving their respective loads in a proper direction or in an improper direction depending on the phase relation of the electrical power supplied thereto; an electrical circuit having a first portion common to both of said motors adapted to be connected to a source of electrical power to be supplied to both of said motors, said circuit further including electrical conductor means interconnecting said first and second electric motors to the common portion of said circuit to insure that said first and second motors are both driven simultaneously in said proper or in said improper directions regardless of the manner in which the first portion of said circuit is connected to the power supply; and means acting only in response to the proper rotation of said pump means to make said circuit between said power source and said first motor, whereby said first electric motor is dependent on the proper driving direction of said second electric motor.

2. In apparatus of the character described, the combination comprising a compressor; a first electric motor operatively connected to drive said compressor, said motor being reversible and capable of driving said compressor in a proper direction or in an improper direction depending on the manner in which said motor is connected to an electric power supply; pump means associated with said compressor for supplying lubricant thereto, said pump means being reversible and adapted to produce a predetermined discharge pressure when driven in a proper direction and being incapable of producing said predetermined discharge pressure when driven in an improper direction; a second electric motor operatively connected to drive said pump means, said motor being reversible and capable of driving said pump means in said proper direction or in said improper direction depending on the manner in which said motor is connected to an electrical power supply; an electrical circuit connecting said first and second motors to an electrical power supply, said circuit including conductor means interconnecting said motors so that they would both drive their respective loads in either said proper direction or in said improper direction simultaneously if the circuits between said motors and said power supply were closed; and an interlock responsive to the discharge pressure of said pump for making and breaking a circuit between said first electric motor and said power supply, said interlock being operable to close said circuit to said first electric motor only when said predetermined discharge pressure is reached.

3. In apparatus of the character described, the combination comprising a compressor; a first electric motor operatively connected to drive said compressor, said motor being reversible and capable of driving said compressor in a proper direction or in an improper direction depending on the manner in which said motor is connected to an electrical power supply; pump means associated with said compressor for supplying lubricant thereto, said pump means being reversible and adapted to produce a predetermined discharge pressure when driven in a proper direction and incapable of producing said predetermined discharge pressure when driven in an improper direction; a second electric motor operatively connected to drive said pump means, said motor being reversible and capable of driving said pump means in a proper direction or in an improper direction depending on the manner in which said motor is connected to an electrical power supply; an electrical circuit connecting said first and second motors to an electrical power supply, said circuit including conductor means interconnecting said motors so that they drive their respective loads in either said proper direction or in said improper direction if the circuits between said motors and said power supply are closed; and an interlock responsive to the discharge pressure of said pump for making and breaking a circuit between said first electric motor and said power supply.

4. In apparatus of the character described, the combination comprising a compressor, said compressor being susceptible to damage if driven in an improper direction; a first electric motor operatively connected to drive said compressor, said motor being capable of driving said compressor in a proper direction or in an improper direction depending on the manner in which said first motor is connected to an electrical power supply; pump means adapted to supply lubricant to said compressor; a second electric motor operatively connected to drive said pump means, said second motor being capable of driving said pump means in a proper direction or in an improper direction depending on the manner in which said second motor is connected to said power supply; an electrical circuit including first electrical conductor means common to both said motors adapted to be connected to said power supply, and second electrical conductor means interconnecting said first and second motors to drive said first and second motors in the same relative direction whereby said pump means and said compressor are both driven in a proper direction or in an improper direction simultaneously as the circuit between said motors and said power supply is closed; switch means in said circuit between said power supply and said first motor adapted to make and break the circuit therebetween; and means responsive to pump discharge pressure to close said switch means after said pressure reaches a predetermined value, whereby if said motors are improperly connected, the circuit will remain open to said first motor due to the failure of said pump means to supply lubricant at said predetermined value.

5. In apparatus of the character described, the combination comprising a compressor having rotor and a drive shaft operatively connected thereto, the connection between said drive shaft and said rotor being such that if such shaft is driven in a first direction, the compressor rotor is maintained firmly affixed to said drive shaft, and if said drive shaft is driven in the opposite direction, said drive shaft is susceptible to becoming disconnected from said rotor; a first electric motor operatively connected to said drive shaft, said motor being capable of driving said drive shaft in said first direction or in said opposite direction depending on the phase relation of the electrical power supplied thereto; pump means adapted to circulate lubricant to said compressor; a second electric motor operatively connected to said pump means in driving relation thereto, said second motor being adapted to run in a first direction in which lubricant is supplied to said compressor and in the opposite direction in which the pressure of lubricant on the discharge side of said pump never reaches a predetermined minimum value, depending on the phase relation of the electrical power supplied thereto; an electrical circuit having a first portion adapted to be coupled to a power supply; switch means in said circuit between said first portion of said circuit means and said first electric motor; means responsive to the pressure of lubricant on the discharge side of said pump means adapted to operate said switch to make and break another portion of said electrical circuit between said power supply and said first motor when said lubricant pressure has reached said predetermined minimum value; electrical conductor means in said circuit interconnecting said first and second electric motors to the first portion of said electrical circuit to insure that said compressor drive shaft and said pump means are both driven in said first direction or in said opposite direction, whereby said first electric motor is prevented from being energized if the first portion of said electrical circuit is improperly connected to said power supply.

References Cited by the Examiner
UNITED STATES PATENTS

| | | | |
|---|---|---|---|
| 2,454,947 | 11/1948 | Schroeder | 318—102 |
| 2,512,332 | 6/1950 | Hyde | 318—102 |
| 3,221,984 | 12/1965 | Ditzler | 230—207 |
| 3,240,424 | 3/1966 | Richardson | 230—207 |
| 3,244,256 | 4/1966 | Fath | 318—481 |

LAURENCE V. EFNER, *Primary Examiner.*